Patented Apr. 21, 1953

2,635,980

UNITED STATES PATENT OFFICE 2,635,980

STABILIZED SULFA DRUG

George L. Christenson, Cincinnati, Ohio, assignor to The Wm. S. Merrell Company, Cincinnati, Ohio, a corporation of Delaware No Drawing. Application February 11, 1950, Serial No. 143,830

2 Claims. (Cl. 167—51.5)

This invention relates to an aqueous therapeutic composition containing a mixture of sulfa drugs.

When either sulfacetamide (N-1 acetyl sulfanilamide) or sulfabenzamide (N-1 benzoyl sulfanilamide) is placed in solution or in solution-suspension in water at a pH within the range 3.5–6.4, the resulting product is unstable, as is evidenced by discoloration and odor formation. However, when sufficient cation, either as sodium, potassium, ammonium, aminoalcohol or alkyl amine, is added to raise the pH of the composition to 6.6 or greater, the stability is enhanced and the aforementioned discoloration is decreased. With the more complex sulfonamides, such as sulfadiazine, sulfamerazine, sulfamethazine, sulfathiazole and sulfapyrazine, on the other hand, the effect of pH changes are just the opposite, the sodium salts of such sulfonamides decomposing at a markedly accelerated rate in comparison with the sulfonamides themselves. The difficulty of preparing a stable aqueous composition containing sulfacetamide or sulfabenzamide and one or more of the heretofore mentioned complex sulfonamides is thus apparent.

In accordance with the present invention, it has been discovered, however, that by preparing an aqueous composition containing solubilized sulfacetamide, solubilized sulfabenzamide or a mixture thereof and one or more of the complex sulfonamides mentioned above having a pH value within the range 6.5–7.5 a composition of satisfactory stability results. This arises from the fact that the salts of the complex sulfonamides are not formed in significant amounts below a pH value of 7.6.

The required adjustment of the pH value of the composition can be accomplished by incorporating into it any of a wide variety of basic substances, such as sodium hydroxide, potassium hydroxide, ammonium hydroxide, monoethanolamine, diethanolamine, methylamine, ethylamine, diethylamine, and so forth. As a result of the addition of a proper amount of any of these basic substances to the composition, soluble and stable salts of sulfacetamide or sulfabenzamide are formed in solution and the complex sulfonamides are present as such in suspension in the mixture. In general, the composition should contain from about 1 to about 5 per cent by weight of the solubilized sulfacetamide or solubilized sulfabenzamide and from about 2 to about 15 per cent by weight of the suspended complex sulfonamide. Usually, the composition will contain only two of the complex sulfonamides in suspension in approximately equal amounts by weight.

If desired, small amounts of certain reducing agents may also be incorporated into the composition to enhance further the stability of the sulfacetamide or sulfabenzamide salt. Among the reducing agents which are suitable are sodium thiosulfate, sodium sulfite, sodium bisulfite, thiosorbitol and thioglycerin. All of these compounds are effective to some degree when used in the proper amounts. Where, for example, the composition contains 3.3 per cent by weight of the solubilized sulfonamide, 3.3 per cent by weight of sulfamerazine and 3.3 per cent by weight of sulfadiazine and has a pH value of 6.8–6.9, the minimal effective levels for the aforementioned reducing agents are as follows: sodium thiosulfate, 0.05 per cent by weight; sodium sulfite, 0.5 per cent by weight; sodium bisulfite, 0.5 per cent by weight; thioglycerin, 0.1 per cent by weight; and thiosorbitol, 0.1 per cent by weight. Also, if desired, the composition may also contain small amounts of additional materials, such as flavors, dyes, sweetening agents, suspending agents, preservatives, and so forth.

The preparation of a specific composition falling within the broad scope of this invention is as follows:

In a suitable mixing tank 50 pounds of USP sodium hydroxide pellets is dissolved in 750 gallons of water. There is then added 13.15 pounds of sodium thiosulfate (calculated as anhydrous sodium thiosulfate) in the form of USP crystals, and when the crystals are dissolved, 278.8 pounds of sulfacetamide is added. The pH of the mixture is then checked and adjusted to 6.8–7.0, using either sodium hydroxide or hydrochloric acid. In order there are then added 25 pounds of soluble USP saccharin, 278.8 pounds of sulfadiazine microcrystals and 278.8 pounds of sulfamerazine microcrystals. The entire mixture is then stirred until it is uniform. In 835 pounds of USP glycerin there are dissolved 4.1 pounds of USP Methyl Paraben and 0.8 pound of USP Propyl Paraben. This solution is then added to the mixture in the mixing tank. Upon the addition of 6 pounds of flavoring material and sufficient water to yield a final volume of 1,000 gallons, a composition containing 0.167 gram of sulfacetamide, 0.167 gram of sulfadiazine and 0.167 gram of sulfamerazine in each unit of 5 cc. results.

I claim:

1. A stable therapeutic composition which consists essentially of an aqueous solution containing from about 1 to about 5 per cent by weight of at least one solubilized material selected from the group consisting of sulfacetamide and sulfabenzamide and having suspended therein from about 2 to about 15 per cent by weight of at least one complex sulfonamide selected from the group consisting of sulfadiazine, sulfamerazine, sulfamethazine, sulfathiazole and sulfapyrazine, the pH of said composition being within the range from 6.5–7.5.

2. A composition as in claim 1 in which said solubilized material is sulfacetamide and in which said complex sulfonamide is composed of a mixture of sulfadiazine and sulfamerazine.

GEORGE L. CHRISTENSON.

References Cited in the file of this patent

UNITED STATES PATENTS

| Number | Name | Date |
| --- | --- | --- |
| 2,484,175 | Lehr | Oct. 11, 1949 |
| 2,491,490 | Folsome | Dec. 20, 1949 |

OTHER REFERENCES

Journal American Pharmaceutical Association, Scientific Edition, January 1944, pages 1 to 10.

Proc. Soc. Exptl. Biol. Med., volume 53, June 1943, pages 142 to 145.

British Medical Journal, January 12, 1946, pages 47 to 50.